US009195529B2

(12) United States Patent
Oota et al.

(10) Patent No.: US 9,195,529 B2
(45) Date of Patent: Nov. 24, 2015

(54) INFORMATION PROCESSING APPARATUS AND ACTIVATION METHOD

(71) Applicant: FUJITSU LIMITED, Kawasaki-shi, Kanagawa (JP)

(72) Inventors: Yuusuke Oota, Hiratsuka (JP); Hidefumi Kobayashi, Yokohama (JP); Tatsuya Yanagisawa, Kawasaki (JP); Mihoko Tojo, Kawasaki (JP); Tsukasa Makino, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 336 days.

(21) Appl. No.: 13/940,300

(22) Filed: Jul. 12, 2013

(65) Prior Publication Data

US 2014/0059335 A1 Feb. 27, 2014

(30) Foreign Application Priority Data

Aug. 21, 2012 (JP) ................................. 2012-182120

(51) Int. Cl.
*G06F 11/07* (2006.01)
*G06F 11/14* (2006.01)

(52) U.S. Cl.
CPC .......... *G06F 11/0703* (2013.01); *G06F 11/079* (2013.01); *G06F 11/0715* (2013.01); *G06F 11/1417* (2013.01)

(58) Field of Classification Search
CPC ............ G06F 11/1407; G06F 11/1412; G06F 11/1435; G06F 11/1474; G06F 11/079; G06F 11/1417
USPC ............................................... 714/15, 16, 17
See application file for complete search history.

(56) References Cited

U.S. PATENT DOCUMENTS

| 5,323,444 | A  | * | 6/1994  | Ertz et al. ........................ 379/45 |
| 6,182,188 | B1 | * | 1/2001  | Hasbun et al. ................ 711/103 |
| 7,130,222 | B1 | * | 10/2006 | Ho et al. .................. 365/185.22 |
| 7,353,259 | B1 | * | 4/2008  | Bakke et al. .................. 709/208 |
| 8,612,803 | B2 | * | 12/2013 | Tashima .......................... 714/36 |
| 2003/0200255 | A1 | * | 10/2003 | Vallone .......................... 709/203 |
| 2005/0246582 | A1 | * | 11/2005 | Nash et al. ...................... 714/12 |
| 2006/0112061 | A1 | * | 5/2006  | Masurkar ........................ 706/47 |
| 2007/0056031 | A1 | * | 3/2007  | Sivaramakrishna Iyer ..... 726/12 |
| 2008/0256445 | A1 | * | 10/2008 | Olch et al. ..................... 715/700 |

(Continued)

FOREIGN PATENT DOCUMENTS

| JP | 62-245340 | 10/1987 |
| JP | 05-108394 | 4/1993 |
| JP | 2011-258245 | 12/2011 |

*Primary Examiner* — Chae Ko
(74) *Attorney, Agent, or Firm* — Fujitsu Patent Center

(57) ABSTRACT

An information processing apparatus manages activation of a program by a task which is a unit of execution, and executes a task for each sequence in units of process block. The information processing apparatus has a nonvolatile memory which keeps an execution state management table. The execution state of the process block is stored in the execution state management table. The control unit performs a first activation procedure which initializes the execution state management table and, while updating the execution state in the execution state management table, executes the task. When activation by the first activation procedure has failed, the control unit performs activation by a second activation procedure and identifies a suspicious sequence. When activation by the second activation procedure has failed, the control unit performs activation by a third activation procedure and identifies a suspicious task.

11 Claims, 26 Drawing Sheets

(56) References Cited

U.S. PATENT DOCUMENTS

| | | | |
|---|---|---|---|
| 2010/0318781 A1* | 12/2010 | Nicolson et al. | 713/2 |
| 2011/0302444 A1* | 12/2011 | Tashima | 714/2 |
| 2011/0307737 A1* | 12/2011 | Uchino | 714/15 |
| 2012/0151272 A1* | 6/2012 | Behrendt et al. | 714/39 |
| 2014/0108775 A1* | 4/2014 | Kludy et al. | 713/2 |
| 2014/0181582 A1* | 6/2014 | Kujawa | 714/16 |

* cited by examiner

FIG. 7

51a(51) APPARATUS ACTIVATION SEQUENCE TABLE

| SEQUENCE | TASK 1 | TASK 2 | TASK 3 | TASK 4 |
|---|---|---|---|---|
| 0 | TASK 1-0 | TASK 2-0 | TASK 3-0 | NO PROCESSING |
| 1 | TASK 1-1 | NO PROCESSING | TASK 3-1 | TASK 4-1 |
| 2 | TASK 1-2 | TASK 2-2 | TASK 3-2 | TASK 4-2 |
| 3 | TASK 1-3 | TASK 2-3 | NO PROCESSING | TASK 4-3 |
| 4 | TASK 1-4 | NO PROCESSING | TASK 3-4 | NO PROCESSING |
| 5 | TASK 1-5 | TASK 2-5 | TASK 3-5 | TASK 4-5 |

FIG. 8

52a(52) SEQUENCE MANAGEMENT TABLE

| SEQUENCE | TASK 1 | TASK 2 | TASK 3 | TASK 4 |
|---|---|---|---|---|
| 0 | UNEXECUTED | UNEXECUTED | UNEXECUTED | NO EXECUTION |
| 1 | UNEXECUTED | NO EXECUTION | UNEXECUTED | UNEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 9

52b(52) SEQUENCE MANAGEMENT TABLE

| SEQUENCE | TASK 1 | TASK 2 | TASK 3 | TASK 4 |
|---|---|---|---|---|
| 0 | BEING EXECUTED | BEING EXECUTED | BEING EXECUTED | NO EXECUTION |
| 1 | UNEXECUTED | NO EXECUTION | UNEXECUTED | UNEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 10

52c(52) SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | UNEXECUTED | NO EXECUTION | UNEXECUTED | UNEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 11

52d(52)  SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | BEING EXECUTED | NO EXECUTION | BEING EXECUTED | BEING EXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 12

52e(52) SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | EXECUTION COMPLETED | EXECUTION COMPLETED |
| 2 | EXECUTION COMPLETED | EXECUTION COMPLETED | EXECUTION COMPLETED | EXECUTION COMPLETED |
| 3 | EXECUTION COMPLETED | EXECUTION COMPLETED | NO EXECUTION | EXECUTION COMPLETED |
| 4 | EXECUTION COMPLETED | NO EXECUTION | EXECUTION COMPLETED | NO EXECUTION |
| 5 | EXECUTION COMPLETED | EXECUTION COMPLETED | EXECUTION COMPLETED | EXECUTION COMPLETED |

FIG. 16

52f(52) SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | BEING EXECUTED | BEING EXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 17

52g(52)  SEQUENCE MANAGEMENT TABLE

| SEQUENCE | TASK 1 | TASK 2 | TASK 3 | TASK 4 |
|---|---|---|---|---|
| 0 | UNEXECUTED | UNEXECUTED | UNEXECUTED | NO EXECUTION |
| 1 | UNEXECUTED | NO EXECUTION | NOT REEXECUTED | NOT REEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 18

52h(52) SEQUENCE MANAGEMENT TABLE

| SEQUENCE | TASK 1 | TASK 2 | TASK 3 | TASK 4 |
|---|---|---|---|---|
| 0 | BEING EXECUTED | BEING EXECUTED | BEING EXECUTED | NO EXECUTION |
| 1 | UNEXECUTED | NO EXECUTION | NOT REEXECUTED | NOT REEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 19

52i(52)  SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | BEING REEXECUTED | NOT REEXECUTED |
| 2 | UNEXECUTED | UNEXECUTED | UNEXECUTED | UNEXECUTED |
| 3 | UNEXECUTED | UNEXECUTED | NO EXECUTION | UNEXECUTED |
| 4 | UNEXECUTED | NO EXECUTION | UNEXECUTED | NO EXECUTION |
| 5 | UNEXECUTED | UNEXECUTED | UNEXECUTED | UNEXECUTED |

FIG. 20

52j(52) SEQUENCE MANAGEMENT TABLE

| SEQUENCE | TASK 1 | TASK 2 | TASK 3 | TASK 4 |
|---|---|---|---|---|
| 0 | UNEXECUTED | UNEXECUTED | UNEXECUTED | NO EXECUTION |
| 1 | UNEXECUTED | NO EXECUTION | NON-EXECUTABLE | NOT REEXECUTED |
| 2 | UNEXECUTED | UNEXECUTED | NON-EXECUTABLE | UNEXECUTED |
| 3 | UNEXECUTED | UNEXECUTED | NON-EXECUTABLE | UNEXECUTED |
| 4 | UNEXECUTED | NO EXECUTION | NON-EXECUTABLE | NO EXECUTION |
| 5 | UNEXECUTED | UNEXECUTED | NON-EXECUTABLE | UNEXECUTED |

FIG. 21

52k(52) SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | NON-EXECUTABLE | NOT REEXECUTED |
| 2 | UNEXECUTED | UNEXECUTED | NON-EXECUTABLE | UNEXECUTED |
| 3 | UNEXECUTED | UNEXECUTED | NON-EXECUTABLE | UNEXECUTED |
| 4 | UNEXECUTED | NO EXECUTION | NON-EXECUTABLE | NO EXECUTION |
| 5 | UNEXECUTED | UNEXECUTED | NON-EXECUTABLE | UNEXECUTED |

FIG. 22

52m(52)  SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | NON-EXECUTABLE | EXECUTION COMPLETED |
| 2 | UNEXECUTED | UNEXECUTED | NON-EXECUTABLE | UNEXECUTED |
| 3 | UNEXECUTED | UNEXECUTED | NON-EXECUTABLE | UNEXECUTED |
| 4 | UNEXECUTED | NO EXECUTION | NON-EXECUTABLE | NO EXECUTION |
| 5 | UNEXECUTED | UNEXECUTED | NON-EXECUTABLE | UNEXECUTED |

FIG. 23

52n(52)   SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | NON-EXECUTABLE | EXECUTION COMPLETED |
| 2 | EXECUTION COMPLETED | EXECUTION COMPLETED | NON-EXECUTABLE | EXECUTION COMPLETED |
| 3 | EXECUTION COMPLETED | EXECUTION COMPLETED | NON-EXECUTABLE | EXECUTION COMPLETED |
| 4 | EXECUTION COMPLETED | NO EXECUTION | NON-EXECUTABLE | NO EXECUTION |
| 5 | EXECUTION COMPLETED | EXECUTION COMPLETED | NON-EXECUTABLE | EXECUTION COMPLETED |

FIG. 24

52p(52)　SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | NON-EXECUTABLE | BEING REEXECUTED |
| 2 | UNEXECUTED | UNEXECUTED | NON-EXECUTABLE | UNEXECUTED |
| 3 | UNEXECUTED | UNEXECUTED | NON-EXECUTABLE | UNEXECUTED |
| 4 | UNEXECUTED | NO EXECUTION | NON-EXECUTABLE | NO EXECUTION |
| 5 | UNEXECUTED | UNEXECUTED | NON-EXECUTABLE | UNEXECUTED |

FIG. 25

52q(52) SEQUENCE MANAGEMENT TABLE

| SEQUENCE | TASK 1 | TASK 2 | TASK 3 | TASK 4 |
|---|---|---|---|---|
| 0 | EXECUTION COMPLETED | EXECUTION COMPLETED | EXECUTION COMPLETED | NO EXECUTION |
| 1 | EXECUTION COMPLETED | NO EXECUTION | NON-EXECUTABLE | NON-EXECUTABLE |
| 2 | EXECUTION COMPLETED | EXECUTION COMPLETED | NON-EXECUTABLE | NON-EXECUTABLE |
| 3 | EXECUTION COMPLETED | EXECUTION COMPLETED | NON-EXECUTABLE | NON-EXECUTABLE |
| 4 | EXECUTION COMPLETED | NO EXECUTION | NON-EXECUTABLE | NON-EXECUTABLE |
| 5 | EXECUTION COMPLETED | EXECUTION COMPLETED | NON-EXECUTABLE | NON-EXECUTABLE |

FIG. 26

51b(51) APPARATUS ACTIVATION SEQUENCE TABLE

| SEQUENCE | TASK 1 | TASK 2 | TASK 3 | TASK 4 |
|---|---|---|---|---|
| 0 | TASK 1-0 | TASK 2-0 | TASK 3-0 | NO PROCESSING |
| 1 | TASK 1-1 | NO PROCESSING | TASK 3-1 | TASK 4-1 |
| 2 | TASK 1-2 | TASK 2-2 SKIP=1 | TASK 3-2 | TASK 4-2 |
| 3 | TASK 1-3 | TASK 2-3 | NO PROCESSING | TASK 4-3 |
| 4 | TASK 1-4 | NO PROCESSING | TASK 3-4 SKIP=1 | NO PROCESSING |
| 5 | TASK 1-5 | TASK 2-5 | TASK 3-5 | TASK 4-5 |

INFORMATION PROCESSING APPARATUS AND ACTIVATION METHOD

CROSS-REFERENCE TO RELATED APPLICATION

This application is based upon and claims the benefit of priority of the prior Japanese Patent Application No. 2012-182120, filed on Aug. 21, 2012, the entire contents of which are incorporated herein by reference.

FIELD

The embodiments discussed herein relate to an information processing apparatus and an activation method.

BACKGROUND

An information processing apparatus performs an activation procedure from power-on to activate a predetermined program. Upon detecting an abnormality that normal activation has failed in the activation procedure, the information processing apparatus attempts automatic recovery by performing reactivation in a recovery procedure.

In order to analyze the cause of such a failure of the activation procedure, there is an information processing apparatus configured to display the state or log the process of the initialization procedure.

Please see, for example, Japanese Laid-open Patent Publication No. 05-108394.

However, in a case where a program abnormality always occurs at the same place (zero-address access, or the like), the information processing apparatus repeatedly performs the recovery procedure, resulting in failure of successful activation.

Accordingly, the information processing apparatus fails to recognize the information of the activation process unless the cause of activation failure is handled in the activation process. Such an information processing apparatus loses information of the activation process by reactivation, making it difficult to investigate the cause of activation failure.

SUMMARY

According to an aspect, there is provided an information processing apparatus including a nonvolatile memory configured to keep an execution state management table capable of storing execution states of process blocks which are divisions of each task and sorted according to sequences; and one or more processors configured to perform a procedure including: performing a first activation which initializes the execution state management table and, while storing the execution state for each of the process blocks in the execution state management table, executes the task for each of the sequences, and activates the information processing apparatus; performing, after activation of the information processing apparatus by the first activation has failed, a second activation which identifies a suspicious sequence having failed to activate the information processing apparatus based on the execution state management table and, while storing the execution state for each of the process blocks in the execution state management table, executes the process block for each task in the suspicious sequence, and activates the information processing apparatus; and performing, after activation of the information processing apparatus by the second activation has failed, a third activation which identifies a suspicious task having failed to activate the information processing apparatus based on the execution state management table, stores the execution state for each of the process blocks in the execution state management table, skips execution of the suspicious task of and after the suspicious sequence, and activates the information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an exemplary apparatus activation sequence table of the second embodiment;

FIG. 8 is an exemplary sequence management table of the second embodiment when initialized;

FIG. 9 is an exemplary sequence management table of the second embodiment when powered on;

FIG. 10 is an exemplary sequence management table of the second embodiment when powered on;

FIG. 11 is an exemplary sequence management table of the second embodiment when powered on;

FIG. 12 is an exemplary sequence management table of the second embodiment when powered on;

FIG. 16 is an exemplary sequence management table of the second embodiment at the time of machine down;

FIG. 17 is an exemplary sequence management table of the second embodiment at the time of machine down;

FIG. 18 is an exemplary sequence management table of the second embodiment at the time of machine down;

FIG. 19 is an exemplary sequence management table of the second embodiment at the time of machine down;

FIG. 20 is an exemplary sequence management table of the second embodiment at the time of machine down;

FIG. 21 is an exemplary sequence management table of the second embodiment at the time of machine down;

FIG. 22 is an exemplary sequence management table of the second embodiment at the time of machine down;

FIG. 23 is an exemplary sequence management table of the second embodiment at the time of machine down;

FIG. 24 is an exemplary sequence management table of the second embodiment at the time of machine down;

FIG. 25 is an exemplary sequence management table of the second embodiment at the time of machine down; and FIG. 26 is an exemplary machine down recovery management table of a third embodiment.

DESCRIPTION OF EMBODIMENTS

Figure 1:
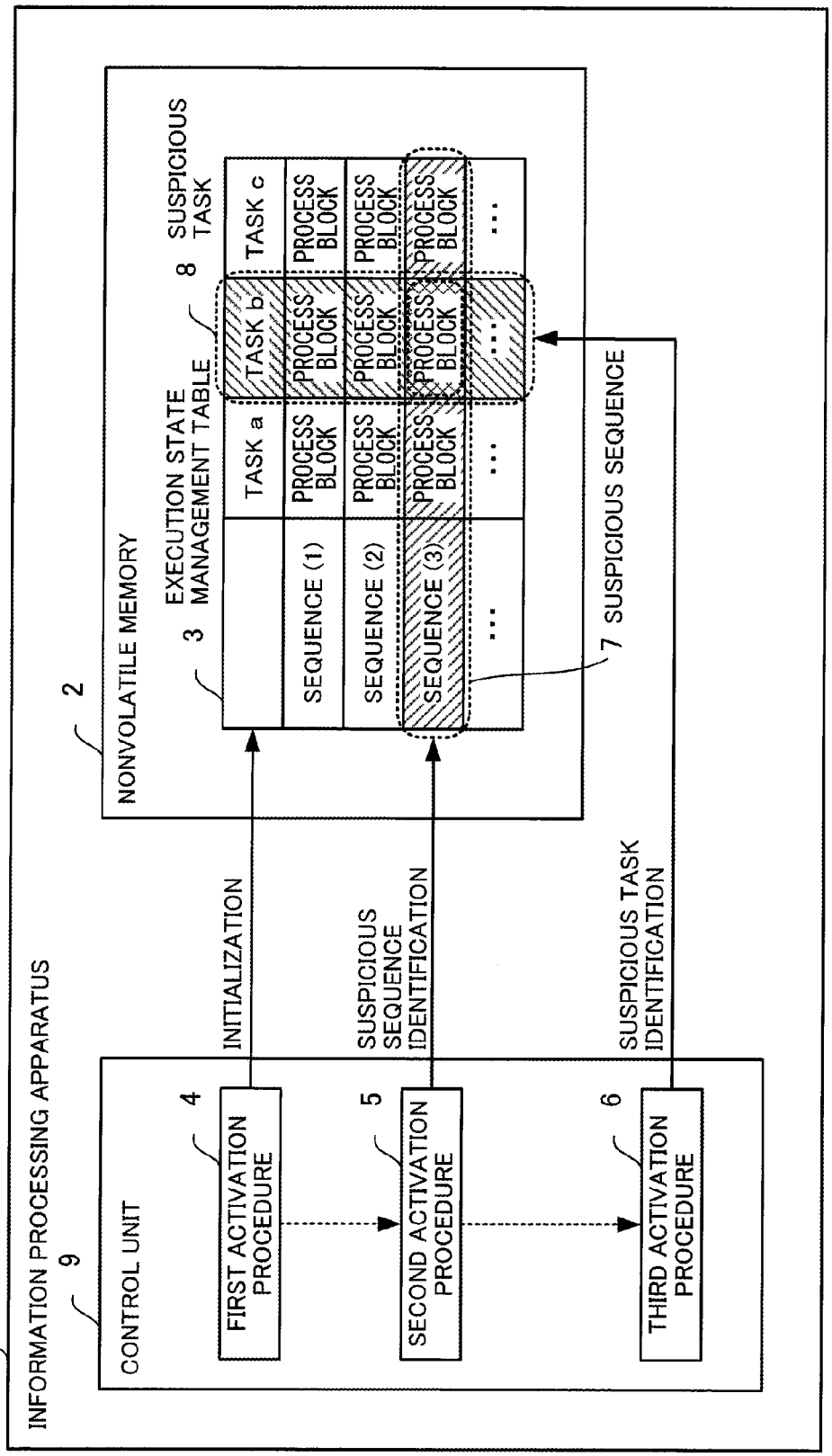
FIG. 1 illustrates an exemplary configuration of an information processing apparatus of a first embodiment.

Several embodiments will be described below with reference to the accompanying drawings, wherein like reference numerals refer to like elements throughout.

First Embodiment

First, an information processing apparatus of a first embodiment will be described using FIG. 1. FIG. 1 illustrates an exemplary configuration of an information processing apparatus of the first embodiment. The information processing apparatus includes a nonvolatile memory and a control unit. The nonvolatile memory keeps an execution state management table capable of storing execution states of process blocks which are divisions of each task and sorted according to sequences. The control unit performs a first activation procedure, a second activation procedure, and a third activation procedure. The first activation procedure initializes the execution state management table and, while storing an execution state for each of the process blocks in the execution state management table, executes a task for each of the sequences and activates the information processing apparatus. After the first activation procedure has failed to activate the information processing apparatus, the second activation procedure identifies the suspicious sequence having failed to activate the information processing apparatus based on the execution state management table and, while storing an execution state for each of the process blocks in the execution state management table, executes a process block for each task in the suspicious sequence and activates the information processing apparatus. After the second activation procedure has failed to activate the information processing apparatus, the third activation procedure identifies a suspicious task having failed to activate the information processing apparatus based on the execution state management table, stores an execution state for each of the process blocks in the execution state management table, skips execution of the suspicious task of and after the suspicious sequence and activates the information processing apparatus.

An information processing apparatus 1 performs an activation procedure that activates a predetermined program (service program) by a predetermined activation trigger (e.g., power-on), according to an activation program. The information processing apparatus 1 manages activation of a program by a task which is a unit of execution. A task is executed for each of the sequences in units of one or more process blocks.

The information processing apparatus 1 includes a nonvolatile memory 2 and a control unit 9. The nonvolatile memory 2 keeps an execution state management table 3 capable of storing execution states of process blocks which are divisions of each task and sorted according to sequences. The nonvolatile memory 2 is a memory capable of keeping information even when power supply to the information processing apparatus 1 is shut down, such as an EEPROM (Electrically Erasable Programmable Read-Only Memory), a flash memory and an HDD (Hard Disk Drive), for example.

The control unit 9 performs a first activation procedure 4, a second activation procedure 5, and a third activation procedure 6. The first activation procedure 4 initializes the execution state management table 3 when activating the information processing apparatus 1. The control unit 9 sets, in the first activation procedure 4, the execution state of each process block stored in the execution state management table 3 to an unexecuted state (state before execution).

In the first activation procedure 4, the control unit 9 executes a task for each of the sequences. For example, when there are the tasks a, b, and c, the control unit 9 simultaneously executes process blocks of the tasks a, b, and c in the sequence (1). The control unit 9 sets the execution state of each process block as "being executed" when starting execution of the process blocks of the tasks a, b, and c. The control unit 9 sets the execution state of each process block as "execution completed" each time execution of each process block is completed. When execution of all the process blocks (process blocks of the tasks a, b, and c) in the sequence (1) has been completed, the control unit 9 executes a process block of a next sequence (2). In this manner, the control unit 9 performs the first activation procedure 4 which executes a task for each of the sequences while storing the execution state of each process block in the execution state management table 3, making the states "before execution", "being executed", and "execution completed" distinguishable.

When the first activation procedure 4 has failed to activate the information processing apparatus 1, the control unit 9 activates the information processing apparatus 1 in the second activation procedure 5. In the second activation procedure 5, the control unit 9 executes activation without initialization of the execution state management table 3, i.e., activation with the stored state of the execution state management table 3 being held.

In the second activation procedure 5, the control unit 9 identifies the suspicious sequence 7 having failed to activate the information processing apparatus 1 based on the execution state management table 3. In the information processing apparatus 1 whose activation by the first activation procedure 4 has failed, several process blocks are being executed in the sequence at the time of activation failure. Since the execution states of these process blocks are stored in the execution state management table 3, the control unit 9 may identify, in the second activation procedure 5, the sequence executing these process blocks as the suspicious sequence 7.

In the second activation procedure 5, the control unit 9 executes a task for each of the sequences similarly to the first activation procedure 4, in sequences before reaching the suspicious sequence 7. In the second activation procedure 5, the control unit 9 executes a process block for each task in the suspicious sequence 7. For example, when there are the tasks a, b, and c, the control unit 9 sequentially executes, in a sequence (3) (suspicious sequence 7), the process blocks of the tasks a, b, and c one by one. The control unit 9 sets the execution state of the process block of the task a as "being executed" when starting execution of the process block of the task a, and sets the execution state of the process block of task a as "execution completed" when the task a is completed. Similarly, thereafter, the control unit 9 sequentially executes process blocks of the tasks b and c one by one. In this manner, the control unit 9 performs the second activation procedure 5 which executes a process block for each task in the suspicious sequence 7, while storing execution states of each of the process blocks in the execution state management table 3, making the states of "before execution", "being executed", and "execution completed" distinguishable.

In the third activation procedure 6, the control unit 9 activates the information processing apparatus 1 when the second activation procedure 5 has failed to activate the information processing apparatus 1. In the third activation procedure 6, the control unit 9 performs activation without initialization of the execution state management table 3, i.e., activation with the stored state of the execution state management table 3 being held.

In the third activation procedure 6, the control unit 9 identifies a suspicious task 8 having failed to activate the information processing apparatus 1 based on the execution state management table 3. In the information processing apparatus 1 whose activation by the second activation procedure 5 has failed, a single process block is being executed in the sequence at the time of activation failure. Since the execution state of the process block is stored in the execution state management table 3, the control unit 9 may identify, in the third activation procedure 6, the task executing the process block as the suspicious task 8.

In the third activation procedure 6, the control unit 9 sets the execution state of the execution state management table 3 to a state in which execution is skipped (non-executable state) for the process block of the suspicious task 8 of and after the suspicious sequence 7. When the activation failure of the information processing apparatus 1 is due to a process block of the suspicious task 8 of and after the suspicious sequence 7, the control unit 9 may activate the information processing apparatus 1 in the third activation procedure 6 by skipping execution of the process blocks of the suspicious task 8 of and after the suspicious sequence 7.

As thus described, the information processing apparatus 1 may be reactivated by removing the cause of activation failure while keeping information of the activation procedure in the nonvolatile memory 2. Accordingly, the information processing apparatus 1 may facilitate identifying the cause of activation failure.

The information processing apparatus 1 may perform the first activation procedure 4 as the activation procedure at the time of power-on, the second activation procedure 5 as the activation procedure at the time of the first machine recovery, and the third activation procedure 6 as the activation procedure at the time of the second machine recovery. In addition, the information processing apparatus 1 may also perform the first activation procedure 4 as the activation procedure at the time of the first machine recovery, the second activation procedure 5 as the activation procedure at the time of the second machine recovery, and the third activation procedure 6 as the activation procedure at the time of the third machine recovery.

Second Embodiment

Figure 2:
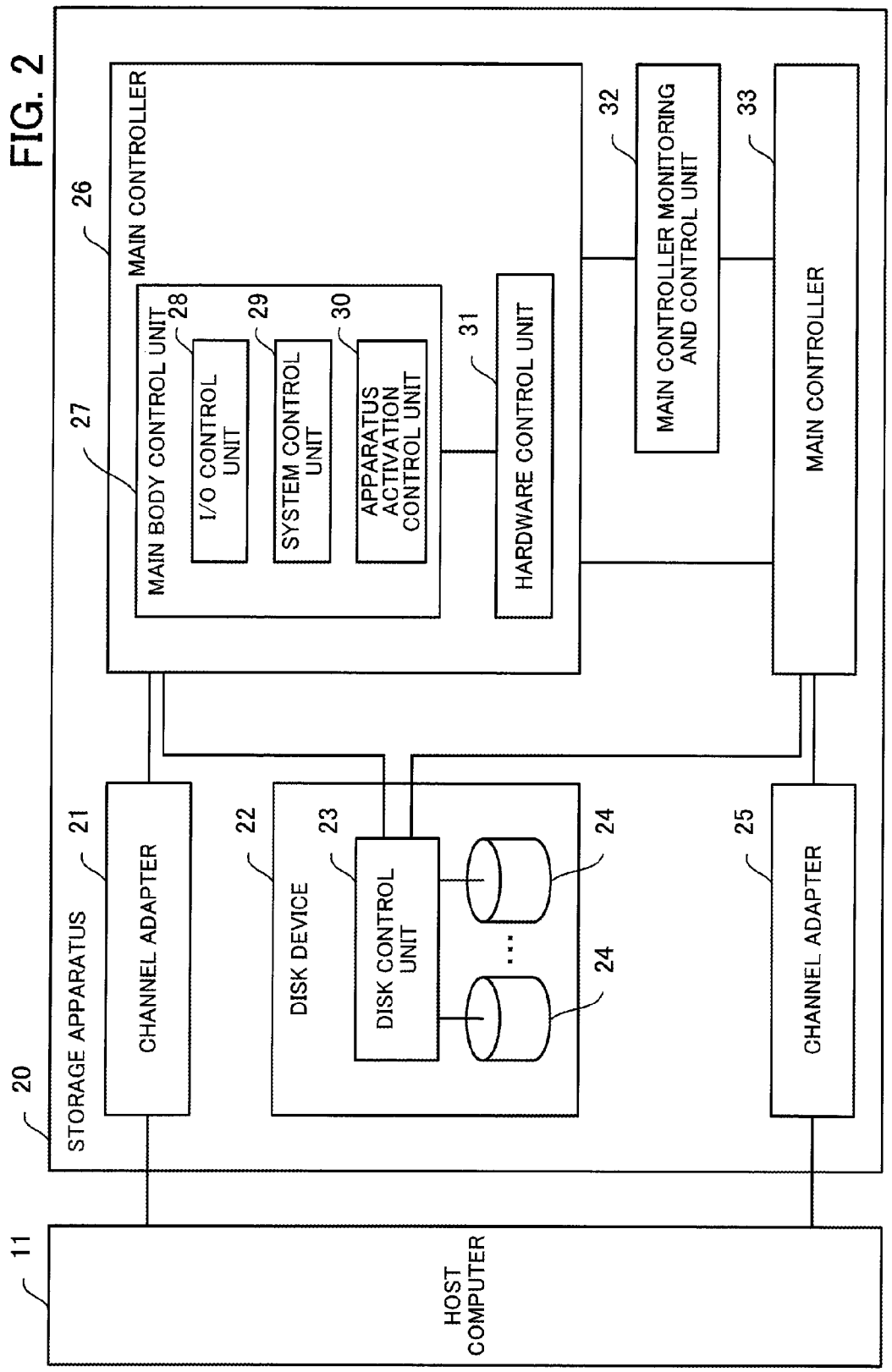
FIG. 2 illustrates an exemplary hardware configuration of a storage apparatus of a second embodiment.

Next, a storage apparatus of a second embodiment will be described, referring to FIG. 2. FIG. 2 illustrates an exemplary hardware configuration of the storage apparatus of the second embodiment.

A storage apparatus 20, which is a storage device capable of storing data, is a component of the information processing apparatus. The storage apparatus 20 reads or writes data according to a request from a host computer 11.

The storage apparatus 20 includes channel adapters 21 and 25, a disk device 22, main controllers 26 and 33, and a main controller monitoring and control unit 32. The storage apparatus 20 is connected to the host computer via the channel adapters 21 and 25. The channel adapter 21 performs connection control between the main controller 26 and the host computer 11. The channel adapter 25 performs connection control between the main controller 33 and the host computer 11.

The main controllers 26 and 33 are main control modules for storage control, and the storage apparatus 20 provides redundant (duplexed) storage control by the main controller 26 and the main controller 33. The main controller monitoring and control unit 32 monitors the state of the main controllers 26 and 33, and disconnects a main controller in which abnormality has been detected.

The main controller 26 includes a main body control unit 27 and a hardware control unit 31. The main body control unit 27 includes an I/O control unit 28, a system control unit 29, and an apparatus activation control unit 30, and performs operation control of the main controller 26. The hardware control unit 31 performs maintaining power supply to a RAM (Random Access Memory) which is not illustrated and reset control of the main body control unit 27.

The I/O control unit 28 performs I/O control with the disk device 22 according to the request from the host computer 11. The system control unit 29 performs system control of the storage apparatus 20.

The apparatus activation control unit 30 performs activation control of the storage apparatus 20 at the time of power-on or machine down recovery. In order to synchronize the activation procedures between the main controllers 26 and 33, the apparatus activation control unit 30 divides the process of activating the storage apparatus 20 into a plurality of process blocks which are then sequenced, and subsequently performs the activation procedure at the time of power-on or machine down recovery.

In addition, the apparatus activation control unit 30 divides into tasks, the control of the I/O control unit 28 and the system control unit 29 of the main body control unit 27, the channel adapters 21 and 25, the disk device 22 etc. and manages the activation procedure for each task. Progress of the activation procedure of the storage apparatus 20 is managed for each sequence. The apparatus activation control unit 30 executes in parallel a plurality of task processes in a single sequence.

The main body control unit 27 including the I/O control unit 28, the system control unit 29, and the apparatus activation control unit 30 operates on a kernel layer (control firmware OS (Operating System)).

The disk device 22, including a disk control unit 23 and one or more disks 24, performs I/O control of the disks 24. The disk control unit 23 performs interface control of the disks 24. The plurality of disks 24, each being an HDD for example, forms a RAID (Redundant Array of Inexpensive Disks).

Since the main controller 33 has a similar configuration to the main controller 26, illustration as well as description thereof will be omitted and substituted by description of the main controller 26.

Figure 3:
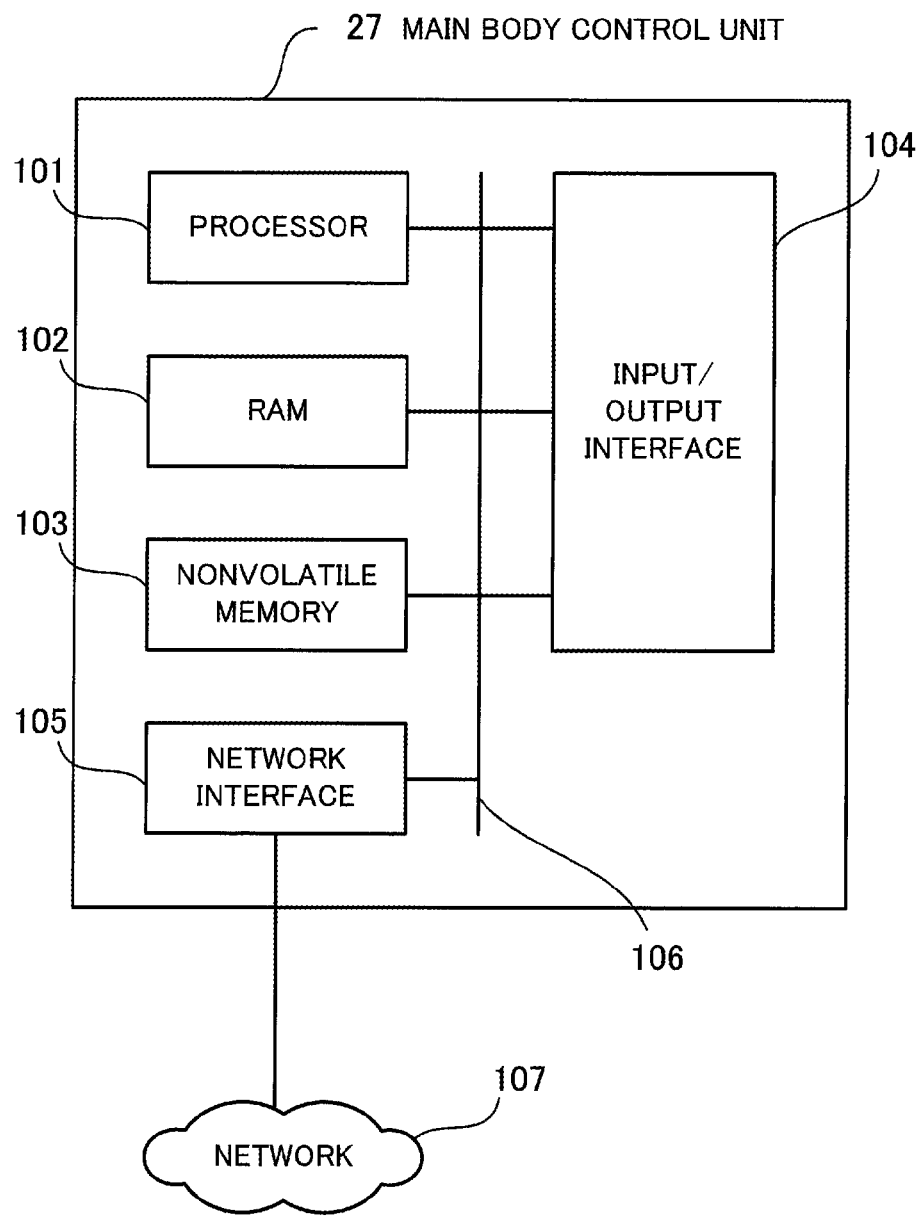
FIG. 3 illustrates an exemplary hardware configuration of a main body control unit of the second embodiment.

Next, the hardware configuration of the main body control unit 27 of the second embodiment will be described, referring to FIG. 3. FIG. 3 illustrates an exemplary hardware configuration of a main body control unit of the second embodiment.

The main body control unit 27 in its entirety is controlled by a processor 101. The processor 101 has a RAM 102 and a plurality of peripheral devices connected thereto via a bus 106. The processor 101 may be a multiprocessor. The processor 101 is, for example, a CPU (Central Processing Unit), an MPU (Micro Processing Unit), a DSP (Digital Signal Processor), an ASIC (Application Specific Integrated Circuit), or a PLD (Programmable Logic Device). In addition, the processor 101 may be a combination of two or more of a CPU, an MPU, a DSP, an ASIC, and a PLD.

The RAM 102 is used as the main memory of the main body control unit 27. The RAM 102 has at least a part of the programs and firmware of the OS, application programs to be executed by the processor 101 temporarily stored therein. In addition, the RAM 102 has various data (e.g., system control information management) needed for processing by the processor 101 stored therein. In addition, the RAM 102 is used as a cache area for storing I/O data from the host computer 11.

As peripheral devices connected to the bus 106, there are a nonvolatile memory 103, an input/output interface 104, and a network interface 105.

The nonvolatile memory 103 keeps the memory content between power-off and power-on, or between before and after resetting the storage apparatus 20. The nonvolatile memory 103 is, for example, a semiconductor memory apparatus such as an EEPROM or a flash memory, or may be an HDD. The nonvolatile memory 103 stores and keeps information used for activation control. In addition, the nonvolatile memory 103 is used as an auxiliary memory apparatus of the main body control unit 27. The nonvolatile memory 103 has programs and firmware of the OS, application programs, and various data stored therein.

The input/output interface 104 is connected to an input/output apparatus to perform input and output. The input/output interface 104 transmits, to the processor 101, signals sent from a keyboard or a mouse connected to the main body control unit 27 or other control units, for example. In addition, the input/output interface 104 outputs signals received from the processor 101 to other control units, or a display or a loud speaker connected to the main body control unit 27, for example.

The network interface 105 allows connection to a network 107. By connecting to the network 107, the network interface 105 transmits and receives data to and from other computers or communication devices via the network 107.

The main body control unit 27 may include a graphic processing apparatus, an optical drive apparatus, and a device connection interface, as necessary.

The graphic processing apparatus is capable of connecting a monitor and displaying an image, according to an instruction from the processor 101. As a monitor, there is a display apparatus using a CRT (Cathode Ray Tube), a liquid crystal display apparatus, or the like.

The optical drive apparatus is capable of reading data stored on an optical disk using laser beam, and the like. An optical disk is a portable storage medium having data stored thereon to be readable using reflection of light. As an optical disk, there is a DVD (Digital Versatile Disc), a DVD-RAM, a CD-ROM (Compact Disc Read Only Memory), a CD-R (Recordable)/RW (ReWritable), or the like.

The device connection interface is a communication interface for connecting peripheral devices to the main body control unit 27. The device connection interface may include a memory unit or a memory reader/writer connected thereto, for example. A memory unit is a storage medium provided with a communication function with the device connection interface. A memory reader/writer is an apparatus which writes data into a memory card or reads data from a memory card. A memory card is a card-type storage medium.

The hardware configuration as described above realizes the processing function of the main body control unit 27 of the second embodiment. The information processing apparatus 1 described in the first embodiment may also be realized by hardware similar to the main body control unit 27 illustrated in FIG. 3.

Moreover, although other control units (the I/O control unit 28, the system control unit 29, and the apparatus activation control unit 30) illustrated in the second embodiment are implemented on a common hardware with the main body control unit 27, they may be implemented on an individual hardware. In such a case, other control units may be realized by a similar hardware to the main body control unit 27.

The main body control unit 27 realizes the processing function of the second embodiment by executing a program stored in a computer readable storage medium, for example. Programs describing the content of process to be executed by the main body control unit 27 may be stored in various storage media. For example, programs to be executed by the main body control unit 27 may be stored in the nonvolatile memory 103. The processor 101 loads, to the RAM 102, at least a part of the programs in the nonvolatile memory 103, and executes the program. In addition, programs to be executed by the main body control unit 27 may be stored in a portable storage medium such as an optical disk, a memory apparatus, a memory card, or the like. A program stored in a portable storage medium becomes capable of execution after having been installed in the nonvolatile memory 103 by control from the processor 101, for example. In addition, the processor 101 may directly read and execute a program from a portable storage medium.

Figure 4:
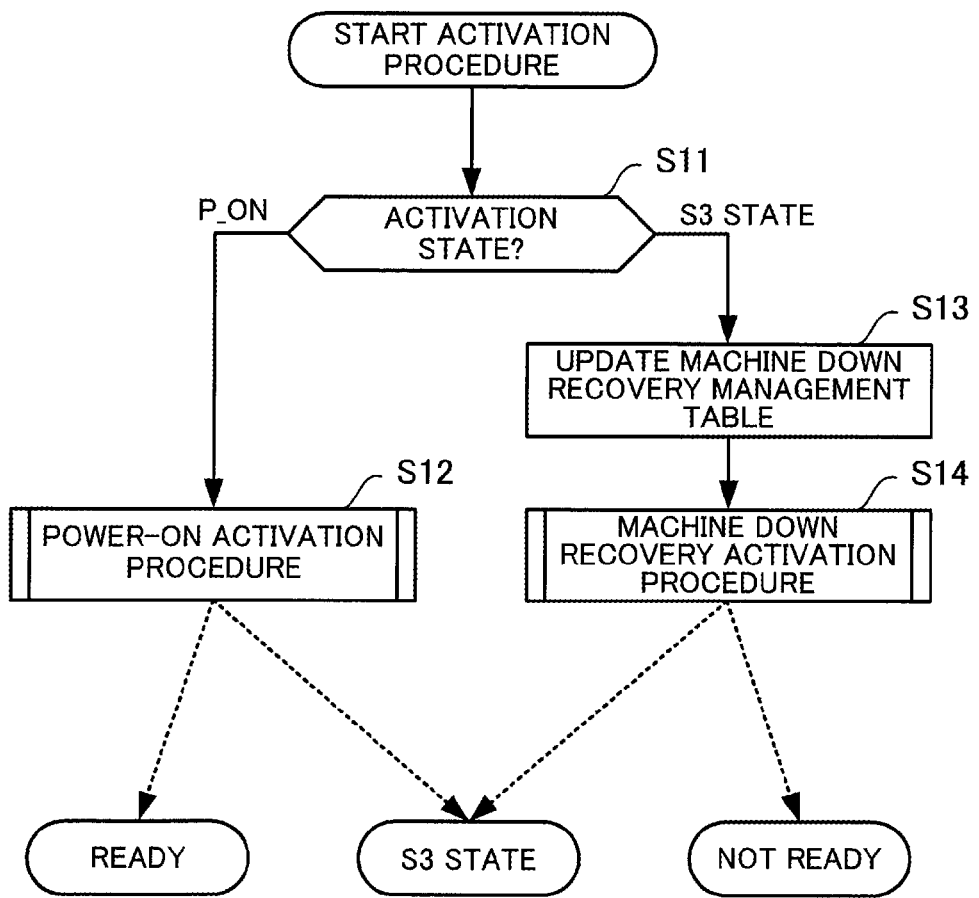
FIG. 4 is a flow chart of an activation procedure of the second embodiment.
Figure 5:
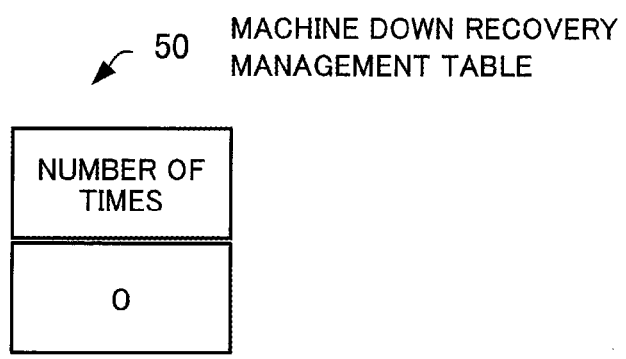
FIG. 5 is an exemplary machine down recovery management table of the second embodiment.

Next, the activation procedure performed by the apparatus activation control unit 30 of the second embodiment will be described, referring to FIGS. 4 and 5. FIG. 4 is a flow chart of the activation procedure of the second embodiment. FIG. 5 is an exemplary machine down recovery management table of the second embodiment.

The activation procedure is a process of controlling activation of the storage apparatus 20. The activation procedure is performed by the apparatus activation control unit 30 at the time of power-on activation or at the time of machine recovery activation.

[Step S11] The apparatus activation control unit 30 determines the activation state of the storage apparatus 20. As the activation state of the storage apparatus 20, there are a power-on (P_ON) state and the machine down recovery state (S3 state). The S3 state is a "standby state" defined in the power saving standard "ACPI" (Advanced Configuration and Power Interface). The S3 state, which is a power consumption suppressing mode, supplies power to the memory but turns off power supply to the disk device 22 and other devices.

The power-on state is an activation state of the storage apparatus 20 from power-on, whereas the machine down recovery state is an activation state of the storage apparatus 20 from a machine down. A machine down refers to a state in which operation of the storage apparatus 20 is not maintained. For example, a machine down refers to a state in which abnormality occurs in the main body control unit 27, components or the like of the main controller 26 and is not normally activated.

Since redundancy of the storage apparatus 20 is provided by the main controllers 26 and 33, a machine down refers to a state in which redundancy is not maintained due to simultaneous failure. The main controller monitoring and control unit 32 checks the state (S3 state) of the hardware control unit 31 of the two main controllers 26 and 33 and determines the possibility of machine recovery. The apparatus activation control unit 30 may determine the activation state of the storage apparatus 20 from the determination of the main controller monitoring and control unit 32.

Detection of the power-on state and the machine down recovery state of each of the main controllers 26 and 33 may be performed by referring to the hardware control unit 31. The hardware control unit 31 receives notification of occurrence of abnormality from the kernel layer which recognized the abnormality that occurred in the main body control unit 27. With the purpose of protecting data, the hardware control unit 31 maintains power supply to the memory (e.g., RAM 102), and stores in the memory (e.g., RAM) in the hardware control unit 31 that the main controller 26 is in the machine down recovery state. The same goes for the main controller 33 as the main controller 26.

Accordingly, the apparatus activation control unit 30 may determine the activation state of the storage apparatus 20. The apparatus activation control unit 30 proceeds to step S12 when the activation state of the storage apparatus 20 is the power-on state, or proceeds to step S13 when the activation state of the storage apparatus 20 is the machine down recovery state.

[Step S12] The apparatus activation control unit 30 performs the power-on activation procedure. The power-on activation procedure is an activation procedure in the power-on state. The storage apparatus 20 enters a "Ready" state in which normal operation is executable when normally activated by performing the power-on activation procedure, or enters the "S3 state" when not normally activated due to detection of abnormality (Panic detected). Details of the power-on activation procedure will be described later, referring to FIG. 6.

[Step S13] The apparatus activation control unit 30 increments by 1 the number of executions of the machine down recovery stored in the machine down recovery management table 50. The machine down recovery management table 50 stored in the nonvolatile memory 103 has stored therein the number of executions of the machine down recovery (machine down recovery activation procedure). The machine down recovery management table 50 is initialized to an initial value 1 in the power-on activation procedure. The apparatus activation control unit 30 may grasp the number of executions of the machine down recovery by looking up the machine down recovery management table 50.

[Step S14] The apparatus activation control unit 30 performs the machine down recovery activation procedure. The machine down recovery activation procedure is an activation procedure in the machine down recovery state.

The apparatus activation control unit 30 provides a reset instruction to the hardware control unit of the main controller 26 to reboot it. In this occasion, the kernel layer has a mechanism of indicating a specific boot mode so that the main body control unit 27 may recognize that the activation is recovery from the machine down. The same goes for the main controller 33 as the main controller 26.

The storage apparatus 20 enters a "Not Ready" state in which activation is performed with limited functionality when no abnormality has been detected by performing the machine down recovery activation procedure, or enters the "S3 state" when abnormality has been detected (Panic detected). Details of the machine down recovery activation procedure will be described later, referring to FIG. 8.

Figure 6:
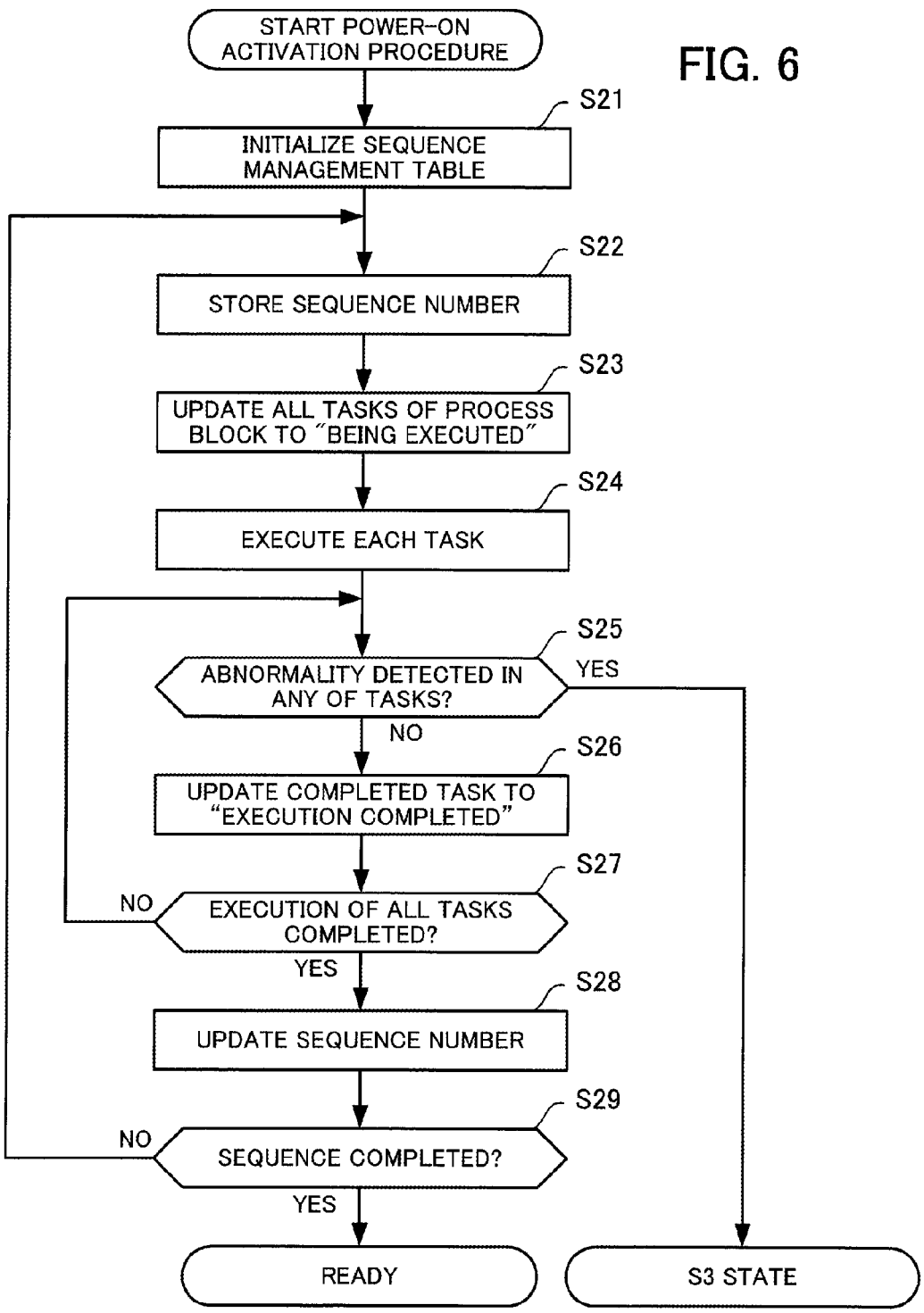
FIG. 6 is a flow chart of a power-on activation procedure of the second embodiment.

Next, the power-on activation procedure performed by the apparatus activation control unit 30 of the second embodiment will be described, referring to FIGS. 6 to 12. FIG. 6 is a flow chart of the power-on activation procedure of the second embodiment. FIG. 7 is an exemplary apparatus activation sequence table of the second embodiment. FIG. 8 is an exemplary sequence management table of the second embodiment when initialized. FIGS. 9 to 12 illustrate an exemplary sequence management table of the second embodiment when powered on.

The power-on activation procedure is a process of controlling activation of the storage apparatus 20 when powered on. The power-on activation procedure is performed by the apparatus activation control unit 30 at step S12 of the activation procedure.

[Step S21] The apparatus activation control unit initializes needed information including a sequence management table 52. The apparatus activation control unit 30 sets, besides the sequence management table 52, the machine down recovery management table 50 to "0" and the sequence number to "0", for example.

Here, the apparatus activation sequence table 51 will be described, referring to FIG. 7. The apparatus activation control unit 30 activates the storage apparatus 20 according to the apparatus activation sequence table 51. The apparatus activation sequence table 51 has stored therein the execution procedure of process blocks for each task to be executed in the power-on activation procedure in the order of sequences.

For example, an apparatus activation sequence table 51a has stored therein the execution procedure of the respective process blocks from the task 1 to the task 4 at six steps from the sequence (0) to the sequence (5). According to the apparatus activation sequence table 51a, the apparatus activation control unit 30 executes the task 1-0 (process block of the task 1), the task 2-0, and the task 3-0 in the sequence (0). Since there is "no processing" of the task 4 in the sequence (0), the apparatus activation control unit 30 does not execute the task 4. Upon completing execution of all the process blocks of the sequence (0), the apparatus activation control unit 30 executes the process block of the sequence (1). Upon completing execution of the process block of the sequence (5) similarly by the apparatus activation control unit 30 thereafter, the apparatus activation sequence is completed.

The apparatus activation control unit 30 initializes the sequence management table 52 according to the apparatus activation sequence table 51. For example, the apparatus activation control unit 30 obtains a sequence management table 52a (see FIG. 8) by performing initialization according to the apparatus activation sequence table 51a. For a process block labeled as having "no processing" in the apparatus activation sequence table 51a, "no execution" is stored in the sequence management table 52a. In addition, for a process block having a process block name (e.g., task 1-0) stored in the apparatus activation sequence table 51a, "unexecuted" is stored in the sequence management table 52a. "No execution" indicates that the process block of the task of interest does not need to be executed in the sequence of interest. In addition, "unexecuted" indicates that the process block of the task of interest is not yet executed in the sequence of interest.

[Step S22] The apparatus activation control unit looks up the sequence number and stores it in the sequence management table 52.

[Step S23] The apparatus activation control unit 30 updates the execution state from "unexecuted" to "being executed" for all the process blocks corresponding to the sequence numbers stored in the sequence management table 52.

For example, when the sequence number stored in the sequence management table 52a is "0", the apparatus activation control unit 30 updates the execution state of the task 1, the task 2, and the task 3 of the sequence (0) from "unexecuted" to "being executed". The apparatus activation control unit 30 does not update the state of the task 4 of the sequence (0) because it is labeled as "no execution". Accordingly, the apparatus activation control unit 30 obtains the sequence management table 52b (see FIG. 9).

[Step S24] The apparatus activation control unit 30 executes the process block whose execution state has been updated to "being executed". In this occasion, the apparatus activation control unit 30 executes the respective process blocks in parallel.

[Step S25] The apparatus activation control unit 30 performs abnormality detection of the process block being executed. The apparatus activation control unit 30 proceeds to step S26 when no abnormality has been detected in the process block being executed, or enters the "S3 state" when abnormality has been detected in the process block being executed.

[Step S26] The apparatus activation control unit 30 updates the execution state of the normally completed process block from "being executed" to "execution completed".

For example, when execution of the task 1, the task 2, and the task 3 of the sequence (0) has been normally completed, the apparatus activation control unit 30 updates the execution state of these process blocks from "being executed" to "execution completed". Here, the apparatus activation control unit 30 does not update the state of the task 4 of the sequence (0) because it is "no execution". Accordingly, the apparatus activation control unit 30 obtains a sequence management table 52c (see FIG. 10).

[Step S27] The apparatus activation control unit 30 monitors the execution state of process blocks to be executed. The apparatus activation control unit 30 determines whether or not execution of all the process blocks to be executed has been completed. The apparatus activation control unit 30 proceeds to step S28 when execution of all the process blocks to be executed has been completed, or proceeds to step S25 when execution of all the process blocks to be executed has not been completed.

[Step S28] The apparatus activation control unit 30 updates the sequence number by an increment of 1.

[Step S29] The apparatus activation control unit 30 determines whether or not an executable sequence has been completed and proceeds to step S22 when it has not been completed, or enters the "Ready" state when it has been completed.

For example, when the sequence (0) has been normally completed, the apparatus activation control unit 30 next executes the sequence (1), and obtains a sequence management table 52d by the second execution of step S23 (see FIG. 11). In this manner, the apparatus activation control unit 30 obtains a sequence management table 52e (see FIG. 12) when the sequence (0) to the sequence (5) have been normally completed.

As thus described, since the apparatus activation control unit 30 stores execution states of process blocks in the sequence management table 52, the "S3 state" is entered, even when abnormality occurs during execution of the power-on activation procedure, making it possible to look up the sequence management table 52.

Figure 13:
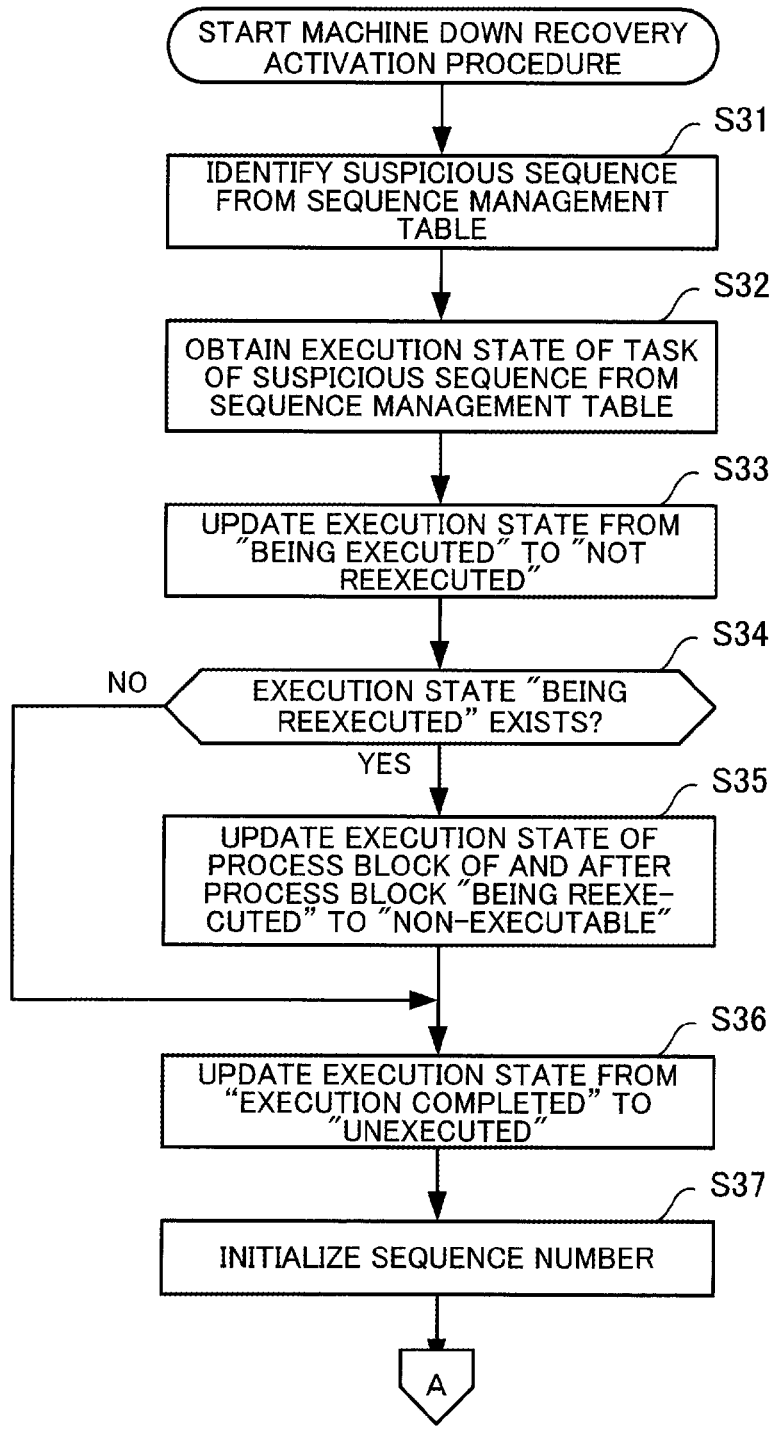
FIG. 13 is a flow chart of the machine down recovery activation procedure of the second embodiment.
Figure 14:
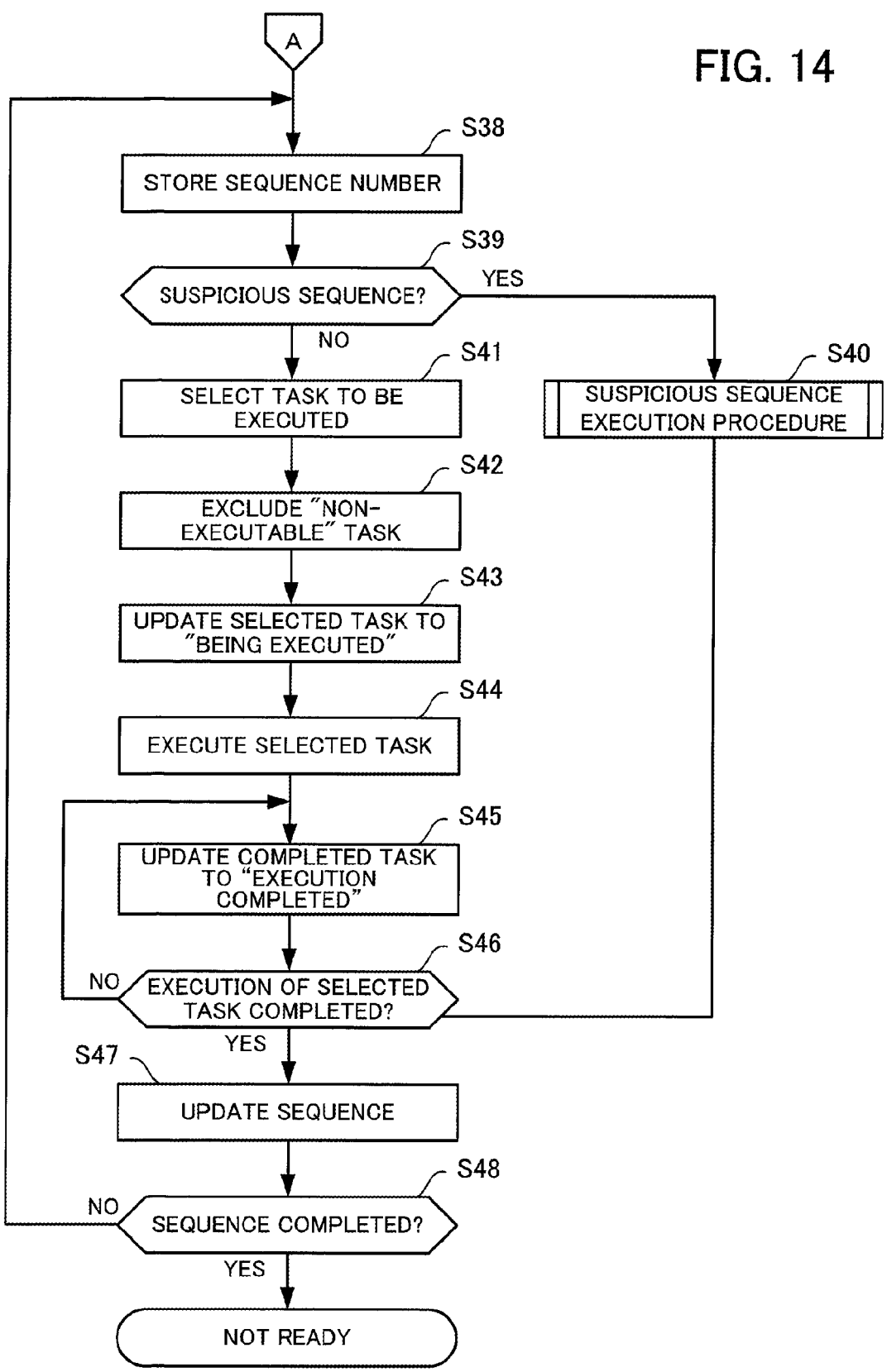
FIG. 14 is a flow chart of the machine down recovery activation procedure of the second embodiment.

Next, the machine down recovery activation procedure performed by the apparatus activation control unit 30 of the second embodiment will be described, referring to FIGS. 13 and 14. FIGS. 13 and 14 are flow charts of the machine down recovery activation procedure of the second embodiment.

The machine down recovery activation procedure is a process of controlling activation of the storage apparatus 20 at the time of machine down recovery. The machine down recovery activation procedure is performed by the apparatus activation control unit 30 at step S14 of the activation procedure.

[Step S31] The apparatus activation control unit 30 identifies, from the sequence management table 52, the sequence at the time of execution of the process block which has caused the machine down as the suspicious sequence. The sequence management table 52 has stored therein the execution state of the process block at the time of machine down in the power-on activation procedure as "being executed". Accordingly, the apparatus activation control unit 30 may identify the sequence including process blocks having an execution state of "being executed" as the suspicious sequence by looking up the sequence management table 52.

[Step S32] The apparatus activation control unit 30 obtains, from the sequence management table 52, all the execution states of the process blocks of the tasks included in the suspicious sequence.

[Step S33] The apparatus activation control unit 30 updates the execution state of the process block having an execution state of "being executed" to "not reexecuted". "Not reexecuted" is an execution state in which the process block is supposed to be reexecuted as a candidate suspicious task.

[Step S34] The apparatus activation control unit 30 determines whether or not there exists any process block having the execution state of "being reexecuted". The apparatus activation control unit 30 proceeds to step S35 when there exists a process block having the execution state of "being reexecuted", or proceeds to step S36 when there exists no process block having the execution state of "being reexecuted".

[Step S35] The apparatus activation control unit 30 updates execution states of process blocks having the execution state of "being reexecuted" and process blocks of and after the task of interest to "non-executable". "Non-executable" indicates an execution state in which the process block is not supposed to be executed.

[Step S36] The apparatus activation control unit 30 updates the execution state to "unexecuted" for all the process blocks of the sequence management table 52 when they have the execution state of "execution completed".

[Step S37] The apparatus activation control unit 30 initializes the sequence number to "0".

[Step S38] The apparatus activation control unit 30 looks up the sequence number and stores it in the sequence management table 52.

[Step S39] The apparatus activation control unit 30 determines whether or not the sequence identified by the sequence number is the suspicious sequence. The apparatus activation control unit 30 proceeds to step S40 when the sequence is the suspicious sequence, or proceeds to step S41 when it is not the suspicious sequence.

[Step S40] The apparatus activation control unit 30 performs a suspicious sequence execution procedure. The suspicious sequence execution procedure is a process of executing a process block of the suspicious sequence which has caused the machine down. Details of the suspicious sequence execution procedure will be described later, referring to FIG. 15.

[Step S41] The apparatus activation control unit 30 selects a process block of a task to be executed in the sequence identified by the sequence number.

[Step S42] The apparatus activation control unit 30 excludes, from the selected process blocks, process blocks having the execution state of "non-executable".

[Step S43] The apparatus activation control unit updates the execution state of the selected process blocks from "unexecuted" to "being executed".

[Step S44] The apparatus activation control unit 30 executes the process block whose execution state has been updated to "being executed". In this occasion, the apparatus activation control unit 30 executes the respective process blocks in parallel.

[Step S45] The apparatus activation control unit 30 updates the execution state of the normally completed process block from "being executed" to "execution completed".

[Step S46] The apparatus activation control unit 30 monitors execution states of process blocks to be executed. The apparatus activation control unit 30 determines whether or not execution of all the process blocks to be executed has been completed. The apparatus activation control unit 30 proceeds to step S47 when execution of all the process blocks to be executed has been completed, or proceeds to step S45 when execution of all the process blocks to be executed has not been completed.

[Step S47] The apparatus activation control unit 30 updates the sequence number by an increment of 1.

[Step S48] The apparatus activation control unit 30 determines whether or not the executable sequence has been completed and proceeds to step S38 when not completed, or enters the "Not Ready" state when completed.

Figure 15:
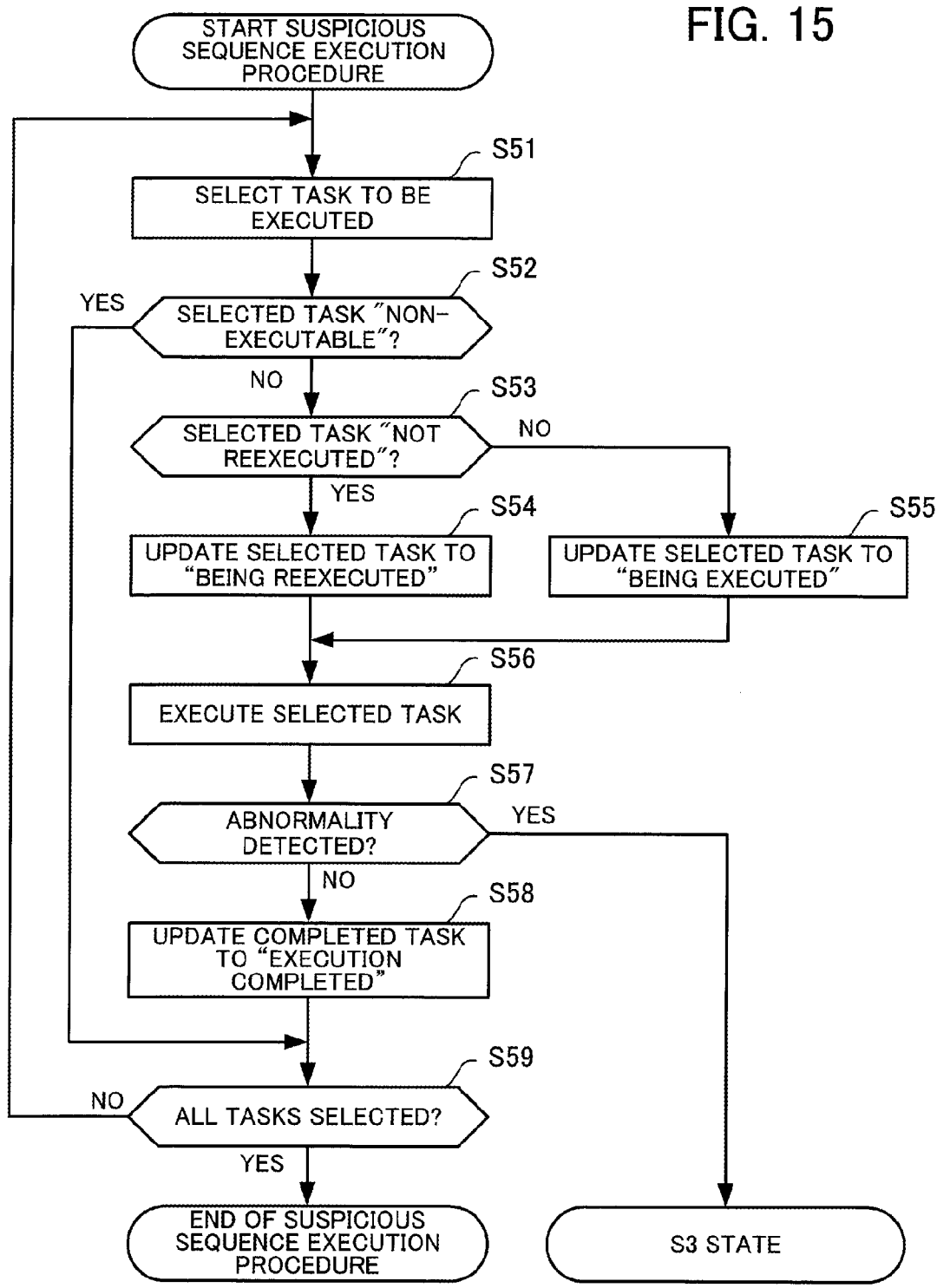
FIG. 15 is a flow chart of a suspicious sequence execution procedure of the second embodiment.

Next, the suspicious sequence execution procedure performed by the apparatus activation control unit 30 of the second embodiment will be described, referring to FIG. 15. FIG. 15 is a flow chart of the suspicious sequence execution procedure of the second embodiment.

The suspicious sequence execution procedure is a process of controlling activation of the storage apparatus 20 at the time of machine down recovery. The suspicious sequence execution procedure is a process of executing a process block of the suspicious sequence which has caused the machine down, and performed by the apparatus activation control unit 30 at step S40 of the machine down recovery activation procedure.

[Step S51] The apparatus activation control unit 30 selects a process block of a task to be executed in the suspicious sequence. In the suspicious sequence execution procedure, a process block to be executed is selected in order to identify the suspicious task.

[Step S52] The apparatus activation control unit 30 determines whether or not the execution state of the selected process block is "non-executable". The apparatus activation control unit 30 proceeds to step S59 when the execution state of the selected process block is "non-executable", or proceeds to step S53 when the execution state of the selected process block is not "non-executable".

[Step S53] The apparatus activation control unit 30 determines whether or not the execution state of the selected process block is "not reexecuted". The apparatus activation control unit 30 proceeds to step S54 when the execution state of the selected process block is "not reexecuted", or proceeds to step S55 when the execution state of the selected process block is not "not reexecuted", i.e., when the state is "unexecuted".

[Step S54] The apparatus activation control unit 30 updates the execution state of the selected process block from "not reexecuted" to "being reexecuted".

[Step S55] The apparatus activation control unit 30 updates the execution state of the selected process block from "unexecuted" to "being executed".

[Step S56] The apparatus activation control unit 30 executes the process block whose execution state has been updated to "being reexecuted" or "being executed". In this occasion, the apparatus activation control unit 30 executes the process blocks one by one. This allows the apparatus activation control unit 30 to identify the process block which has caused the machine down.

[Step S57] The apparatus activation control unit 30 performs abnormality detection of the process block being executed. The apparatus activation control unit 30 proceeds to step S58 when no abnormality has been detected in the process block being executed, or enters the "S3 state" when abnormality has been detected in the process block being executed.

[Step S58] The apparatus activation control unit 30 updates the execution state of the normally completed process block from "being executed" to "execution completed".

[Step S59] The apparatus activation control unit 30 determines whether or not all the process blocks of the task to be executed have been selected. The apparatus activation control unit 30 proceeds to step S51 when not all of the process blocks of the task to be executed have been selected, or completes the suspicious sequence execution procedure when all of them have been selected.

Accordingly, the apparatus activation control unit 30 may identify the suspicious sequence by execution of the first machine down recovery activation procedure, and may identify a suspicious task (suspicious process block) in the second machine down recovery activation. When there is a plurality of suspicious tasks, the apparatus activation control unit 30 may identify suspicious tasks one by one in the third and later machine down recovery activation. The apparatus activation control unit 30 may perform activation in the "Not Ready" state by excluding, from the tasks to be executed, suspicious tasks one by one. The apparatus activation control unit 30 may keep, in the nonvolatile memory 103, the sequence management table 52 capable of identifying the process block which has caused a machine down.

Next, the activation procedure execution process at the time of machine down will be described referring to the updating process of the sequence management table illustrated in FIGS. 16 to 23. FIGS. 16 to 23 illustrate an exemplary sequence management table of the second embodiment at the time of machine down.

It is assumed that the machine down described here has occurred during execution of a process block of the task 3 in the sequence (1).

Upon start of execution of the first machine down recovery procedure, the nonvolatile memory 103 keeps a sequence management table 52*f* (see FIG. 16). Since there exists a process block having the execution state of "being executed" in the task 3 and the task 4 of the sequence (1) in the sequence management table 52*f*, the apparatus activation control unit 30 may identify by the first machine down recovery procedure that the sequence (1) is the suspicious task.

The apparatus activation control unit 30 updates the execution state of the process block having the execution state of "being executed" to "not reexecuted", and updates the execution state of the process block having the execution state of "reexecution completed" to "unexecuted". Accordingly, the apparatus activation control unit 30 obtains a sequence management table 52*g* (see FIG. 17).

The apparatus activation control unit 30 updates the execution state of the process block to be executed to "being executed", assuming the process block of the sequence (0) (the task 1, the task 2 and the task 3) to be executed, except for the task 4 whose process block having the execution state of "no execution". The apparatus activation control unit 30 executes in parallel the process blocks assumed to be executed in the sequence (0). Accordingly, the apparatus activation control unit 30 obtains a sequence management table 52*h* (see FIG. 18).

The apparatus activation control unit 30, after execution of the process block to be executed in the sequence (0), updates the execution state of the process block to be executed in the sequence (0) to "execution completed". The apparatus activation control unit 30 advances the execution sequence from the sequence (0) to the sequence (1). The apparatus activation control unit 30 executes the process blocks one by one, in the sequence (1) which is the suspicious sequence. For example, the apparatus activation control unit 30 executes the process blocks in the order of the task 1, the task 2 (not executed because its execution state is "no execution"), the task 3, and the task 4. A sequence management table 52*i* (see FIG. 19) indicates that the execution state of the task 1 is "execution completed" and the execution state of the task 3 is "being reexecuted".

Here, execution of the process block of the task 3 in the sequence (1) causes a machine down. Therefore, the sequence management table 52*i* is kept in the nonvolatile memory 103 when starting execution of the second machine down recovery procedure.

Since the execution state of the process block of the task 3 of the sequence (1) of the sequence management table 52*i* is "being reexecuted", the apparatus activation control unit 30 may recognize in the second machine down recovery procedure that the task 3 of the sequence (1) is the suspicious task.

The apparatus activation control unit 30 updates the execution state of the process blocks of and after the sequence (1) of the task 3 to "non-executable", and updates the execution state of the process block having the execution state of "reexecution completed" to "unexecuted". Accordingly, the apparatus activation control unit 30 obtains a sequence management table 52j (see FIG. 20). The process blocks of and after the sequence (1) of the task 3 will not be executed since their execution states have been updated to "non-executable".

Although the apparatus activation control unit 30 has successfully identified the suspicious task which has caused the machine down, it advances the procedure similarly to the first machine down recovery procedure, since the execution state of the process block of the task 4 of the sequence (1) is still "not reexecuted". A sequence management table 52k (see FIG. 21) indicates the before execution state of the process block of the task 4 which is another candidate suspicious task in the sequence (1).

Here, when execution of a process block of the task 4 which is another candidate suspicious task has been normally completed, the apparatus activation control unit 30 updates the execution state of the process block of the task 4 which is a candidate suspicious task to "execution completed". Accordingly, the apparatus activation control unit 30 obtains a sequence management table 52m (see FIG. 22). Thereafter, the apparatus activation control unit 30 may perform activation in the "Not Ready" state without occurrence of a machine down.

In this occasion, the nonvolatile memory 103 keeps a sequence management table 52n (see FIG. 23). Since the execution state of the process blocks of and after the sequence (1) of the task 3 in the sequence management table 52n is "non-executable", the machine down may be attributed to the process block of the task 3 of the sequence (1).

Next, the activation procedure execution process at the time of another machine down will be described by the updating process of the sequence management table, referring to FIGS. 24 and 25. FIGS. 24 and 25 illustrate an exemplary sequence management table of the second embodiment at the time of machine down.

It is assumed that the machine down described here has occurred during execution of a process block of the task 3 or a process block of the task 4 in the sequence (1).

Since the process of updating the sequence management table 52 to the state indicated by the sequence management table 52k (see FIG. 21) is similar to the activation procedure execution process at the time of machine down described above, explanation thereof is omitted.

The apparatus activation control unit 30, after execution of the process block to be executed in the sequence (0), updates the execution state of the process block to be executed in the sequence (0) to "execution completed". The apparatus activation control unit 30 advances the execution sequence from the sequence (0) to the sequence (1). The apparatus activation control unit 30 executes the process blocks one by one in the sequence (1) which is the suspicious sequence. For example, the apparatus activation control unit 30 executes the process blocks in the order of the task 1, the task 2 (not executed because its execution state is "no execution"), the task 3 (not executed because its execution state is "non-executable"), and the task 4. A sequence management table 52p (see FIG. 24) indicates that the execution state of the task 1 is "execution completed" and the execution state of the task 4 is "being reexecuted".

Here, execution of the process block of the task 4 in the sequence (1) causes a machine down. Therefore, the sequence management table 52p is kept in the nonvolatile memory 103 when starting execution of the third machine down recovery procedure.

Thereafter, the apparatus activation control unit 30 may perform the third machine down recovery procedure which is similar to the second machine down recovery procedure, and perform activation in the "Not Ready" state.

In this occasion, the nonvolatile memory 103 keeps a sequence management table 52q (see FIG. 25). Since the execution state of the process blocks of and after the sequence (1) is "non-executable" for the task 3 and the task 4 in the sequence management table 52q, the machine down may be attributed to the process block of the task 3 and the task 4 of the sequence (1).

As thus described, the sequence management table 52 may keep storing even when there is a plurality of causes of the machine down. Accordingly, the storage apparatus 20 may be activated, with the cause of the machine down having been eliminated. In addition, the storage apparatus 20 is activated while keeping the processing status (information of activation process) at the time of activation, and whereby inspection of the cause of abnormality is facilitated.

Third Embodiment

Next, the storage apparatus 20 of a third embodiment will be described, referring to FIG. 26. FIG. 26 is an exemplary machine down recovery management table of the third embodiment.

In the second embodiment, the apparatus activation control unit 30 performs the power-on activation and the machine down recovery activation of the storage apparatus 20, according to the apparatus activation sequence table 51a. The third embodiment differs from the second embodiment in that some of the process blocks are skipped in the machine down recovery activation of the storage apparatus 20.

In the machine down recovery activation, there may be a case where some of the process blocks may be preferably skipped, since power-on activation has already been performed. Therefore, the apparatus activation control unit 30 sets a skip flag to a process block to be skipped when starting the machine down recovery activation (e.g., before or after step S31), as indicated by the apparatus activation sequence table 51b. Specifically, the apparatus activation sequence table 51b sets a skip flag (skip=1) to the task 2-2 (process block of the task 2 of the sequence (2)) and the task 3-4 (process block of the task 3 of the sequence (4)).

Accordingly, the apparatus activation control unit 30 may skip a process block of interest by looking up the apparatus activation sequence table 51b and updating the execution state of a process block of the task of interest of the sequence of interest in the sequence management table 52 to "no execution".

Accordingly, the apparatus activation control unit 30 may reflect priority of reactivation/data protection from the operation state of the storage apparatus 20 to the machine down recovery activation.

Setting of the skip flag may be preliminarily performed. For example, a plurality of types of the apparatus activation sequence table 51 having different skip settings may be preliminarily prepared, and the apparatus activation sequence table 51 may be selected according to the environmental condition (e.g., tangible cause of machine down) at the time of machine down recovery activation.

Although the storage apparatus 20 has been exemplified above, other types of information processing apparatus may be applicable.

The apparatus activation control unit 30 may generate the apparatus activation sequence table 51 from the log of the activation process at the time of normal activation. Accordingly, the present technique becomes applicable to an information processing apparatus with no fixed activation condition such as the number of sequences or tasks.

In addition, although the initialization procedure of the sequence management table 52 is performed in the power-on activation procedure, it may be performed in the first machine down recovery activation procedure. In this case, the apparatus activation control unit 30 may identify the suspicious sequence in the second machine down recovery activation procedure. The apparatus activation control unit 30 may grasp the number of activations of the machine down recovery activation procedure by the machine down recovery management table 50.

When performing the initialization procedure of the sequence management table 52 in the power-on activation procedure, the power-on activation procedure corresponds to the first activation procedure 4 of the first embodiment. In addition, when performing the initialization procedure of the sequence management table 52 in the first machine down recovery activation procedure, the first machine down recovery activation procedure corresponds to the first activation procedure 4 of the first embodiment.

The above-mentioned processing function may be realized by a computer. In such a case, there are provided programs describing the processing contents of functions to be provided in the information processing apparatus 1, the storage apparatus 20 (the main body control unit 27, the I/O control unit 28, the system control unit 29, the apparatus activation control unit 30, the hardware control unit 31, the disk control unit 23, and the like). The above-mentioned processing functions are realized on a computer by executing the programs by the computer. The programs describing the processing contents may be stored in a computer readable storage medium. As a computer readable storage medium, there are a magnetic storage apparatus, an optical disk, an optical magnetic storage medium, a semiconductor memory, or the like. As a magnetic storage apparatus, there is a hard disk drive (HDD), a flexible disk (FD), a magnetic tape, or the like. As an optical disk, there is a DVD, a DVD-RAM, a CD-ROM/RW, or the like. As an optical magnetic storage media, there is an MO (Magneto-Optical disk), or the like.

When distributing a program, a portable storage medium such as a DVD or a CD-ROM, for example, storing the program is put on the market. In addition, a program may be stored in the storage apparatus of a server computer, and the program may be transferred to other computers from the server computer via a network.

The computer supposed to execute a program stores, in its storage apparatus, the program stored in a portable storage medium or transferred from the server computer, for example. The computer then reads the program from its storage apparatus and performs a process according to the program. The computer may read the program directly from the portable storage medium and perform a process according to the program. In addition, whenever a program is transferred from the server computer connected via a network, the computer may also sequentially perform processes according to the received program.

In addition, at least a part of the processing functions described above may also be realized by an electronic circuit such as a DSP, an ASIC, a PLD, or the like.

According to one aspect, reactivation may be performed with the cause of activation failure having been eliminated in the information processing apparatus and the activation method, while keeping information of the activation process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a nonvolatile memory configured to keep an execution state management table capable of storing execution states of process blocks which are divisions of each task and sorted according to sequences; and
one or more processors configured to perform a procedure including:
performing a first activation which initializes the execution state management table and, while storing the execution state for each of the process blocks in the execution state management table, executes the task for each of the sequences, and activates the information processing apparatus;
performing, after activation of the information processing apparatus by the first activation has failed, a second activation which identifies a suspicious sequence having failed to activate the information processing apparatus based on the execution state management table and, while storing the execution state for each of the process blocks in the execution state management table, executes the process block for said each task in the suspicious sequence, and activates the information processing apparatus; and
performing, after activation of the information processing apparatus by the second activation has failed, a third activation which identifies a suspicious task having failed to activate the information processing apparatus based on the execution state management table, stores the execution state for each of the process blocks in the execution state management table, skips execution of the suspicious task of and after the suspicious sequence, and activates the information processing apparatus.

2. The information processing apparatus according to claim 1, wherein the procedure further includes setting the task executing the process block in the suspicious sequence as a candidate suspicious task, and stores, in the execution state management table, an execution state of the suspicious task and an execution state of the candidate suspicious task in a distinguishable manner, at the time of activating the information processing apparatus by the second activation.

3. The information processing apparatus according to claim 2, wherein the procedure further includes setting the process blocks of and after the suspicious sequence having failed to activate the information processing apparatus by the second activation as process blocks not to be executed in the suspicious task.

4. The information processing apparatus according to claim 3, wherein the procedure further includes performing the third activation again, when activation of the information processing apparatus by the third activation has failed.

5. The information processing apparatus according to claim 1, wherein the procedure further includes initializing the execution state management table based on a preliminarily set execution procedure of process blocks for said each task.

6. The information processing apparatus according to claim 1, wherein the first activation is activation of the information processing apparatus based on detection of power-on, and the second activation and the third activation are activation of the information processing apparatus based on machine recovery.

7. The information processing apparatus according to claim 1, wherein activation of the information processing apparatus by the first activation, the second activation, and the third activation are activation of the information processing apparatus based on machine recovery.

8. The information processing apparatus according to claim 1, wherein the procedure further includes skipping some of the process blocks, in the activation of the information processing apparatus based on machine recovery.

9. The information processing apparatus according to claim 1, wherein the procedure further includes
- storing the execution state of each of the process blocks in the execution state management table, making the states of "before execution", "being executed", and "execution completed" distinguishable, in the first activation and the second activation, and
- storing the execution state of each of the process blocks in the execution state management table, making the suspicious process block having failed to activate the information processing apparatus identifiable, in the third activation.

10. A computer-readable storage medium storing a computer program, the computer program causing a computer to perform a procedure comprising:
- initializing, at a first activation which activates an information processing apparatus, an execution state management table existing in a nonvolatile memory and capable of storing execution states of process blocks which are divisions of each task and sorted according to sequences;
- executing the task for each of the sequences while storing an execution state for each of the process blocks in the execution state management table;
- identifying, at a second activation which activates the information processing apparatus after the first activation has failed, a suspicious sequence having failed the first activation based on the execution state management table;
- executing the process blocks for said each task in the suspicious sequence while storing an execution state for each of the process blocks in the execution state management table;
- identifying, at a third activation which activates the information processing apparatus after the second activation has failed, a suspicious task having failed the second activation based on the execution state management table, storing an execution state for each of the process blocks in the execution state management table, and skipping execution of the suspicious task of and after the suspicious sequence.

11. An activation method performed by a computer, the method comprising:
- initializing, at a first activation which activates an information processing apparatus, an execution state management table existing in a nonvolatile memory and capable of storing execution states of process blocks which are divisions of each task and sorted according to sequences;
- executing the task for each of the sequences while storing an execution state for each of the process blocks in the execution state management table;
- identifying, at a second activation which activates the information processing apparatus after the first activation has failed, a suspicious sequence having failed the first activation based on the execution state management table;
- executing the process blocks for said each task in the suspicious sequence while storing an execution state for each of the process blocks in the execution state management table;
- identifying, at a third activation which activates the information processing apparatus after the second activation has failed, a suspicious task having failed the second activation based on the execution state management table, storing an execution state for each of the process blocks in the execution state management table, and skipping execution of the suspicious task of and after the suspicious sequence.

* * * * *